United States Patent
Gerard

(10) Patent No.: US 10,683,405 B2
(45) Date of Patent: Jun. 16, 2020

(54) LIQUID (METH)ACRYLIC SYRUP FOR IMPREGNATING A FIBROUS SUBSTRATE, METHOD OF IMPREGNATING A FIBROUS SUBSTRATE, COMPOSITE MATERIAL OBTAINED FOLLOWING POLYMERISATION OF THE PRE-IMPREGNATED SUBSTRATE

(71) Applicant: Arkema France, Colombes (FR)

(72) Inventor: Pierre Gerard, Denguin (FR)

(73) Assignee: Arkema France, Colombes (FR)

( * ) Notice: Subject to any disclaimer, the term of this patent is extended or adjusted under 35 U.S.C. 154(b) by 698 days.

(21) Appl. No.: 14/774,179

(22) PCT Filed: Mar. 10, 2014

(86) PCT No.: PCT/FR2014/050542
§ 371 (c)(1),
(2) Date: Sep. 10, 2015

(87) PCT Pub. No.: WO2014/140467
PCT Pub. Date: Sep. 18, 2014

(65) Prior Publication Data
US 2016/0017106 A1    Jan. 21, 2016

(30) Foreign Application Priority Data

Mar. 11, 2013 (FR) ...................... 13 52148

(51) Int. Cl.
| | | |
|---|---|---|
| *C08J 5/24* | (2006.01) | |
| *C09D 4/06* | (2006.01) | |
| *C08F 265/06* | (2006.01) | |
| *B29C 70/48* | (2006.01) | |
| *B29K 33/00* | (2006.01) | |
| *B29K 105/08* | (2006.01) | |
| *B29K 309/08* | (2006.01) | |

(52) U.S. Cl.
CPC ............ *C08J 5/24* (2013.01); *B29C 70/48* (2013.01); *C08F 265/06* (2013.01); *C09D 4/06* (2013.01); *B29K 2033/08* (2013.01); *B29K 2105/0809* (2013.01); *B29K 2309/08* (2013.01); *B29K 2995/0026* (2013.01); *C08J 2333/06* (2013.01); *C08J 2333/12* (2013.01); *C08J 2425/08* (2013.01); *C08J 2435/06* (2013.01)

(58) Field of Classification Search
CPC . C09D 4/06; C08J 5/24; C08J 2333/06; C08J 2333/12; C08J 2425/08; C08J 2435/06; B29C 70/48; B29K 2995/0026; B29K 2309/08; B29K 2105/0809; B29K 2033/08; C08F 265/06
USPC .......................................... 524/533
See application file for complete search history.

(56) References Cited

U.S. PATENT DOCUMENTS

| | | |
|---|---|---|
| 2,684,305 A | 7/1954 | Qninliven |
| 3,287,155 A | 11/1966 | Munn |
| 2014/0256850 A1 | 9/2014 | Gerard et al. |
| 2015/0218362 A1 | 8/2015 | Gerard et al. |

FOREIGN PATENT DOCUMENTS

| | | | |
|---|---|---|---|
| JP | 54-078787 | 6/1979 | |
| JP | 59047248 A * | 3/1984 | |
| JP | 2008-276203 | 11/2008 | |
| WO | WO-2013056845 A2 * | 4/2013 | ............... C08J 5/24 |
| WO | WO 2014/135810 A2 | 9/2014 | |
| WO | WO 2014/135815 A1 | 9/2014 | |
| WO | WO 2014/135816 A1 | 9/2014 | |
| WO | WO 2014/140467 A1 | 9/2014 | |

OTHER PUBLICATIONS

Bouatique AFNOH—ASTM D 1003 2011-01 "Standard Test Method for Haze and Luminous Transmittance of Transparent Plastics" ASTM International, pp. 1-7.

* cited by examiner

*Primary Examiner* — Angela C Scott
(74) *Attorney, Agent, or Firm* — Thomas F. Roland

(57) ABSTRACT

The present invention relates to a liquid (meth)acrylic syrup for impregnating a fibrous substrate. The present invention relates in particular to a viscous liquid syrup mainly containing methacrylic or acrylic components. The invention also relates to a process for manufacturing such a syrup. The invention also relates to a process for impregnating a fibrous substrate comprising long glass fibers with said viscous liquid syrup. The invention also relates to a fibrous substrate preimpregnated with said syrup, which is useful for manufacturing transparent parts especially for the building sector. The present invention also relates to a manufacturing process for manufacturing transparent parts obtained via this process.

15 Claims, No Drawings

LIQUID (METH)ACRYLIC SYRUP FOR IMPREGNATING A FIBROUS SUBSTRATE, METHOD OF IMPREGNATING A FIBROUS SUBSTRATE, COMPOSITE MATERIAL OBTAINED FOLLOWING POLYMERISATION OF THE PRE-IMPREGNATED SUBSTRATE

This application claims benefit, under U.S.C. § 119 or § 365 of PCT Application Number PCT/FR2014/050542, filed Mar. 10, 2014; and French Application Number FR 13.52148, filed Mar. 11, 2013.

FIELD OF THE INVENTION

The present invention relates to a liquid (meth)acrylic syrup for impregnating a fibrous substrate.

More particularly, the invention relates to a viscous liquid (meth)acrylic syrup mainly containing methacrylic or acrylic components and a component for rendering transparent/translucent a composite material comprising a fibrous substrate based on glass fibers, and a thermoplastic matrix obtained after polymerization of the syrup. The invention also relates to a process for impregnating a fibrous substrate comprising long glass fibers with said viscous liquid syrup. The invention also relates to a fibrous substrate preimpregnated with said syrup which is useful for manufacturing composite parts.

The present invention also relates to a process for manufacturing composite parts and to composite parts obtained via this process.

PRIOR ART

Mechanical parts that have to withstand high stresses during their use are widely manufactured from composite materials. A composite material is a macroscopic combination of two or more immiscible materials. The composite material consists of at least one material which forms the matrix, i.e. a continuous phase that ensures the cohesion of the structure, and a reinforcing material.

The purpose of using a composite material is to obtain performance qualities that are not available from each of its constituents when they are used separately. Consequently, composite materials are widely used in several industrial sectors, for instance building, automotive, aerospace, transport, leisure, electronics, and sport notably due to their better mechanical performance (higher tensile strength, higher tensile modulus, higher fracture toughness) and their low density, in comparison with homogeneous materials.

The most important class, in view of volume at the commercial industrial scale, is that of composites with organic matrices, in which the matrix material is generally a polymer. The matrix of a polymeric composite material is either a thermoplastic polymer or a thermosetting polymer.

Thermosetting polymers consist of crosslinked three-dimensional structures. In order to prepare the polymeric composite material, a prepolymer is mixed with the other component, such as glass beads or fibers, or the other component is wetted or impregnated and cured afterwards. Examples of prepolymers or matrix material for thermosetting polymers are unsaturated polyesters, vinyl esters, and epoxy or phenolic materials. Heating of the polymer chains makes it possible to crosslink and harden the material permanently.

A major drawback of thermosetting polymeric matrix is its crosslinking. The matrix cannot be easily fashioned into other forms. Once the polymer has crosslinked, the form is set. This also makes difficult the recycling of the thermosetting composite material and of manufactured mechanical or structured parts or articles comprising said thermosetting composite material, which are burned in a cement plant or thrown into a waste dump.

To allow thermoforming and recycling, it is preferred to use thermoplastic polymers.

Thermoplastic polymers consist of linear or branched polymers, which are not crosslinked. The thermoplastic polymers are heated in order to mix the constituents necessary for manufacturing the composite material and are cooled to set the final form. The problem is the very high viscosity of its molten thermoplastic polymers.

In order to prepare a polymeric composite material based on thermoplastic polymer, a thermoplastic polymer resin in the molten state, commonly known as a "syrup", is used to impregnate the reinforcing material, for example a fibrous substrate. A syrup that satisfies this problem was developed by the Applicant and is described in patent application FR 1159553, or its PCT extension WO 2013/056845, and in patent application FR 1256929 or its PCT extension WO 2014/013028. Once polymerized, the thermoplastic polymeric syrup constitutes the matrix of the composite material. At the time of impregnation, the viscosity of the impregnation syrup must be controlled and adapted so as not to be too fluid or too viscous, so as to impregnate correctly each fiber of the fibrous substrate. When the wetting is partial, depending on whether the syrup is too fluid or too viscous, "naked" zones, i.e. non-impregnated zones, and zones in which drops of polymer form on the fibers, which are the cause of the creation of bubbles, respectively appear. These "naked" zones and these bubbles give rise to the appearance of defects in the final composite material, which are the cause, inter alia, of a loss of mechanical strength of the final composite material.

An increasing need is felt, especially in the building sector, for transparent or translucent elements. These elements may be roofing or facade elements or alternatively building walls. When there are no stipulations regarding the mechanical rigidity, the materials used are transparent thermoplastics such as polymethyl methacrylate.

There are at the present time transparent composite materials made of thermosetting polymer. Mention may be made, for example, of a material sold under the brand name Acrylit G10. However, this composite material consists of a polyester acrylic resin reinforced with glass fibers. The material is thus a thermosetting composite that is neither thermoforming nor recyclable. Furthermore, this composite material shows very poor resistance to UV radiation since it yellows after about one year of exposure. This material is therefore unsuitable for exterior use, especially for making roofing or facade elements of buildings.

Once the elements to be made must have mechanical strength, it is preferred to use a composite material.

TECHNICAL PROBLEM

The aim of the invention is thus to remedy at least one of the drawbacks of the prior art.

The invention is especially directed toward proposing a part made of transparent/translucent thermoplastic composite material.

The invention is also directed toward completely, correctly and uniformly wetting the fibrous substrate during the impregnation. Any defect in the wetting of the fibers, for example by bubbles and voids, reduces the mechanical performance qualities of the final composite part and its ability to obtain total light transmission (losses associated with the scattering of light by the defects in the material).

Another object of the present invention is to propose a process that can be performed at low cost and that allows industrial-scale manufacture of thermoplastic composite parts. In addition, the process should be easy and simple to perform using commercially available compounds. The manufacture of the composite parts should also be reproducible and fast, meaning short cycle times.

BRIEF DESCRIPTION OF THE INVENTION

It has been discovered, surprisingly, that a liquid (meth)acrylic syrup for impregnating a fibrous substrate, said fibrous substrate consisting of long glass fibers of refractive index n1, said impregnation syrup being characterized in that it comprises:
  a) a (meth)acrylic monomer,
  b) at least one component, of refractive index n3, such that n3≥n1,
said (meth)acrylic syrup having a refractive index n4 that tends toward n1 and a dynamic viscosity of between 10 mPa·s and 10 000 mPa·s, preferably between 50 mPa·s and 5000 mPa·s and advantageously between 100 mPa·s and 1000 mPa·s, gives total and correct impregnation of the fibrous substrate and transparency of the composite material obtained after polymerization of said preimpregnated substrate, the degree of light transmission being between 50% and 100%, preferably greater than 70%.

The Applicant has also discovered, surprisingly, that an impregnation process for impregnating a fibrous substrate, said fibrous material consisting of long glass fibers, the fibers having an aspect ratio of at least 1000, preferably of at least 1500, more preferably of at least 2000, advantageously of at least 3000, more advantageously of at least 5000, even more advantageously of at least 6000, more advantageously still of at least 7500 and most advantageously of at least 10 000 and said process comprising a step of impregnating said fibrous substrate with said liquid (meth)acrylic impregnation syrup, gives total and correct impregnation of the fibrous substrate and a transparent substrate after polymerization, the degree of light transmission being between 50% and 100%, preferably greater than 70%.

It has also been discovered, surprisingly, that a process for manufacturing composite parts, comprising the following steps:
  a) impregnating a fibrous substrate made of long glass fibers of refractive index n1 with such a liquid (meth)acrylic syrup,
  b) polymerizing the liquid (meth)acrylic syrup impregnating said fibrous substrate, makes it possible to obtain thermoplastic composite parts with transparency properties, with a degree of light transmission of between 50% and 100%, preferably greater than 70%, and which are very resistant to UV radiation.

DETAILED DESCRIPTION OF THE INVENTION

The term "fibrous substrate" as used refers to fabrics, felts or nonwovens that may be in the form of strips, laps, braids, locks or pieces.

The term "long fiber" as used refers to fibers having an aspect ratio of at least 1000, preferably at least 1500, more preferably at least 2000, advantageously at least 3000 and more advantageously at least 5000, even more advantageously at least 6000, more advantageously still at least 7500 and most advantageously at least 10 000.

The term "(meth)acrylic" as used refers to any type of acrylic or methacrylic monomer.

The term "PMMA" as used refers to homo- and copolymers of methyl methacrylate (MMA), the weight ratio of MMA in the PMMA being at least 70 wt % for the MMA copolymer.

The term "monomer" as used refers to a molecule that can undergo polymerization.

The term "SMA" as used refers to the styrene-maleic anhydride copolymer.

The term "polymerization" as used refers to the process of converting a monomer or a mixture of monomers into a polymer.

The term "thermoplastic polymer" as used refers to a polymer that turns to a liquid or becomes more liquid or less viscous when heated and that can take on new shapes by the application of heat and pressure.

The term "thermosetting polymer" as used refers to a prepolymer in a soft, solid or viscous state that changes irreversibly into an unmeltable, insoluble polymer network by curing.

The term "polymer composite" as used refers to a multicomponent material comprising several different phase domains, among which at least one type of phase domain is a continuous phase and in which at least one component is a polymer.

The term "transparent or translucent" as used relates to a material with a total degree of transmission of visible light of between 50% and 100%, preferably greater than 70%, according to the light transmission measurements defined by the measuring standard ASTM D 1003.

The term "light transmission" as used means the transmission of waves of the visible and infrared spectrum, namely light whose wavelength is between 380 nm and 780 nm.

The term "refractive index" refers to the refractive indices n1, n2, n3 and n4 of the media through which the light of the visible spectrum passes.

According to a first aspect, the present invention relates to a liquid (meth)acrylic syrup for impregnating a fibrous substrate, said fibrous substrate consisting of long glass fibers of refractive index n1 and said syrup being characterized in that it comprises:
  a) a (meth)acrylic monomer,
  b) at least one component, of refractive index n3, such that n3 n1, said (meth)acrylic syrup having a refractive index n4 which tends toward n1 and a dynamic viscosity of between 10 mPa·s and 10 000 mPa·s, preferably between 50 mPa·s and 5000 mPa·s and advantageously between 100 mPa·s and 1000 mPa·s.

As regards the (meth)acrylic monomer, the monomer is chosen from acrylic acid, methacrylic acid, hydroxyalkyl acrylic monomers, hydroxyalkyl methacrylic monomers, alkyl acrylic monomers and alkyl methacrylic monomers, and mixtures thereof.

Preferably, the monomer is chosen from acrylic acid, methacrylic acid, hydroxyalkyl acrylic monomers, hydroxyalkyl methacrylic monomers, alkyl acrylic monomers, alkyl methacrylic monomers and mixtures thereof, the alkyl group containing from 1 to 22 linear, branched or cyclic carbons; the alkyl group preferably containing from 1 to 12 linear, branched or cyclic carbons.

Advantageously, the (meth)acrylic monomer is chosen from methyl methacrylate, ethyl methacrylate, methyl acrylate, ethyl acrylate, methacrylic acid, acrylic, acid, n-butyl acrylate, isobutyl acrylate, n-butyl methacrylate, isobutyl methacrylate, cyclohexyl acrylate, cyclohexyl methacrylate, isobornyl acrylate, isobornyl methacrylate, hydroxyethyl acrylate and hydroxyethyl methacrylate, and mixtures thereof.

More advantageously, the (meth)acrylic monomer is chosen from methyl methacrylate, isobornyl acrylate and acrylic acid, and mixtures thereof.

According to a preferred embodiment, at least 50% by weight and preferably at least 60% by weight of the monomer is methyl methacrylate.

According to a more preferred embodiment, at least 50% by weight, preferably at least 60% by weight, more preferably at least 70% by weight, advantageously at least 80% by weight and even more advantageously 90% by weight of the monomer is a mixture of methyl methacrylate with isobornyl acrylate and/or acrylic acid.

As regards the (meth)acrylic polymer, mention may be made of polyalkyl methacrylates or polyalkyl acrylates. According to a preferred embodiment, the (meth)acrylic polymer is polymethyl methacrylate (PMMA).

The term "PMMA" denotes a methyl methacrylate (MMA) homopolymer or copolymer or mixtures thereof.

According to one embodiment, the methyl methacrylate (MMA) homo- or copolymer comprises at least 70%, preferably at least 80%, advantageously at least 90% and more advantageously at least 95% by weight of methyl methacrylate.

According to another embodiment, the PMMA is a mixture of at least one homopolymer and at least one copolymer of MMA, or a mixture of at least two homopolymers or two copolymers of MMA with a different average molecular weight, or a mixture of at least two copolymers of MMA with a different monomer composition.

The copolymer of methyl methacrylate (MMA) comprises from 70% to 99.7% by weight of methyl methacrylate and from 0.3% to 30% by weight of at least one monomer containing at least one ethylenic unsaturation that can copolymerize with methyl methacrylate.

These monomers are well known and mention may be made especially of acrylic and methacrylic acids and alkyl (meth)acrylates in which the alkyl group contains from 1 to 12 carbon atoms. As examples, mention may be made of methyl acrylate and ethyl, butyl or 2-ethylhexyl (meth) acrylate. Preferably, the comonomer is an alkyl acrylate in which the alkyl group contains from 1 to 4 carbon atoms.

According to a preferred embodiment, the copolymer of methyl methacrylate (MMA) comprises from 80% to 99.7%, advantageously from 90% to 99.7% and more advantageously from 90% to 99.5% by weight of methyl methacrylate and from 0.3% to 20%, advantageously from 0.3% to 10% and more advantageously from 0.5% to 10% by weight of at least one monomer containing at least one ethylenic unsaturation that can copolymerize with methyl methacrylate. Preferably, the comonomer is chosen from methyl acrylate and ethyl acrylate, and mixtures thereof.

The weight average molecular mass of the (meth)acrylic polymer should be high, meaning more than 50 000 g/mol and preferably more than 100 000 g/mol.

The weight-average molecular mass may be measured by size exclusion chromatography (SEC).

The refractive index $n2$ of the (meth)acrylic polymer is from 1.48 to 1.50, preferably from 1.485 to 1.495 and more advantageously from 1.487 to 1.493.

The (meth)acrylic polymer is fully soluble in the (meth) acrylic monomer or in the mixture of (meth)acrylic monomers. It enables the viscosity of the (meth)acrylic monomer or the mixture of (meth)acrylic monomers to be increased. The solution obtained is generally called a "syrup" or "prepolymer". The dynamic viscosity value of the liquid (meth)acrylic syrup is between 10 mPa·s and 10 000 mPa·s, preferably between 50 mPa·s and 5000 mPa·s and advantageously between 100 mPa·s and 1000 mPa·s. The viscosity of the syrup can be readily measured with a rheometer or a viscometer. The dynamic viscosity is measured at 25° C. The liquid (meth)acrylic syrup has Newtonian behavior, meaning that there is no shear-thinning, so that the dynamic viscosity is independent of the shear in a rheometer or of the speed of the spindle in a viscometer. Such a viscosity of the syrup obtained allows correct impregnation of the fibers of the fibrous substrate.

Advantageously, the liquid (meth)acrylic syrup contains no additional voluntarily added solvent.

The liquid (meth)acrylic syrup according to the invention, for impregnating the fibrous substrate, especially comprises a) a (meth)acrylic monomer or a mixture of (meth)acrylic monomers, and b) at least one compound for rendering transparent the thermoplastic polymer matrix obtained after polymerization of the syrup.

As regards component b), it is chosen from components with a refractive index $n3$, such that $n3 > n2$ and which can be mixed with the (meth)acrylic polymer or the mixture of (meth)acrylic polymer and (meth)acrylic monomer and which make it possible to have a dynamic viscosity of between 10 mPa·s and 10 000 mPa·s, preferably between 50 mPa·s and 5000 mPa·s and advantageously between 100 mPa·s and 1000 mPa·s.

This component b) is chosen from:
styrene-maleic anhydride (SMA) polymer present in a proportion of at least 10% by weight, preferably at least 15%, advantageously at least 20% and more advantageously at least 25% by weight of the total liquid (meth)acrylic syrup,
to be completely miscible in the (meth)acrylic syrup and to maintain this miscibility during the polymerization of the syrup, i.e. to have a transparent thermoplastic resin, the styrene-maleic anhydride polymer must contain between 15% and 50% of maleic anhydride monomer, preferably between 20% and 35%, or
styrene, present in a proportion of at least 10% by weight, preferably at least 15%, advantageously at least 20% and more advantageously at least 25% by weight of the total liquid (meth)acrylic syrup.

In order to conserve a dynamic viscosity of the (meth) acrylic syrup such that it allows good impregnation of the fibrous substrate and to conserve the thermoplastic properties of the matrix obtained after polymerization of the fibrous substrate preimpregnated with syrup, the component(s) of the syrup are incorporated in the following mass percentages:

The (meth)acrylic monomer(s) in the liquid (meth)acrylic syrup are present in a proportion of at least 90% by weight, preferably 85% by weight, advantageously 80% by weight and more advantageously 75% by weight of the total liquid (meth)acrylic syrup.

The (meth)acrylic polymer(s) in the liquid (meth)acrylic syrup are present in a proportion of at least 10% by weight, preferably at least 15%, advantageously at least 20% and more advantageously at least 25% by weight of the total liquid (meth)acrylic syrup.

When the chosen component b) is styrene-maleic anhydride, the syrup more particularly comprises:

a) from 70% by weight to 80% by weight of a (meth)acrylic monomer,
b) from 20% by weight to 30% by weight of styrene-maleic anhydride.

As regards the process for manufacturing the liquid (meth)acrylic syrup, with the styrene-maleic anhydride SMA polymer,
   a first step consists in preparing a first syrup comprising the (meth)acrylic monomer or mixture of (meth)acrylic monomers,
   the styrene-maleic anhydride SMA polymer is then added to the monomer in the proportions indicated above to conserve a dynamic viscosity of between 10 mPa·s and 10 000 mPa·s, preferably between 50 mPa·s and 5000 mPa·s and advantageously between 100 mPa·s and 1000 mPa·s.

By virtue of the presence of its maleic anhydride functionalities, this polymer is miscible in the (meth)acrylic polymer. Its refractive index n3 is from 1.565 to 1.585, preferably from 1.57 to 1.582 and more advantageously from 1.574 to 1.580 and greater than n2, n2 being the index of the (meth)acrylic polymer. Mixing them in the above proportions makes it possible to obtain a (meth)acrylic syrup of refractive index n4. Furthermore, this polymer has a viscosity similar to that of the (meth)acrylic polymer.

When the chosen component b) is styrene, the syrup more particularly comprises:
a) from 50% by weight to 80% by weight of a (meth)acrylic monomer,
b) from 10% by weight to 25% by weight of styrene,
c) from 10% by weight to 25% by weight of a (meth)acrylic polymer.

Preferably, the syrup comprises:
a) from 50% by weight to 80% by weight of a (meth)acrylic monomer,
b) from 10% by weight to 45% by weight of styrene,
c) from 2.5% by weight to 30% by weight of a (meth)acrylic polymer,
d) from 2.5% by weight to 30% by weight of a (meth)acrylicstyrene copolymer, comprising from 10% to 50% by weight of styrene.

Furthermore, more advantageously, the syrup comprises:
a) from 50% by weight to 80% by weight of a (meth)acrylic monomer,
b) from 10% by weight to 40% by weight of styrene,
c) from 5% by weight to 30% by weight of a (meth)acrylic polymer,
d) from 5% by weight to 30% by weight of a (meth)acrylic-styrene copolymer, comprising from 10% to 50% by weight of styrene.

As regards the process for manufacturing the liquid (meth)acrylic syrup, with styrene,
   a first step consists in preparing a first syrup comprising the (meth)acrylic monomer or mixture of (meth)acrylic monomers and a (meth)acrylic polymer,
   styrene is then added in the proportions indicated above to conserve a dynamic viscosity of between 10 mPa·s and 10 000 mPa·s, preferably between 50 mPa·s and 5000 mPa·s and advantageously between 100 mPa·s and 1000 mPa·s.

At the time of the subsequent polymerization of the syrup, the styrene and the (meth)acrylic monomer then form a (meth)acrylic-styrene copolymer whose refractive index n3 varies as a function of the number of styrene units in the polymer chain of the (meth)acrylic polymer undergoing formation.

Furthermore, in the case where styrene is incorporated into the (meth)acrylic syrup, it is possible to replace all or some of the (meth)acrylic polymer, used for increasing the viscosity of the (meth)acrylic monomer or monomer mixture, with a (meth)acrylic-styrene copolymer. Preferably, this copolymer is polymethacrylate-co-styrene, comprising from 10% to 50% by weight of styrene.

The liquid (meth)acrylic impregnation syrup also comprises an initiator or an initiating system for starting the polymerization of the monomer(s). Mention may be made of heat-activated initiators or initiating systems.

The heat-activated initiator is preferably a radical initiator.

As regards the radical initiator, it may be chosen from diacyl peroxides, peroxy esters, dialkyl peroxides, peroxyacetals and azo compounds.

To start the polymerization of the monomer(s), the initiator or the initiating system is chosen from isopropyl carbonate, benzoyl peroxide, lauroyl peroxide, caproyl peroxide, dicumyl peroxide, tert-butyl perbenzoate, tert-butyl per(2-ethylhexanoate), cumyl hydroperoxide, 1,1-di(tert-butylperoxy)-3,3,5-trimethylcyclohexane, tert-butyl peroxyisobutyrate, tert-butyl peracetate, tert-butyl perpivalate, amyl perpivalate, tert-butyl peroctoate, azobisisobutyronitrile (AIBN), azobisisobutyramide, 2,2'-azobis(2,4-dimethylvaleronitrile) and 4,4'-azobis(4-cyanopentanoic) acid. It would not be a departure from the scope of the invention to use a mixture of radical initiators chosen from the above list.

Preferably, to start the polymerization of the monomer(s) the initiator or the initiating system is chosen from peroxides containing 2 to 20 carbon atoms.

The content of radical initiator relative to the monomer(s) of the liquid (meth)acrylic syrup is from 100 to 50 000 ppm by weight (50 000 ppm=5% by weight), preferably between 200 and 40 000 ppm by weight and advantageously between 300 and 30 000 ppm by weight.

As regards the process for impregnating the fibrous substrate, it comprises a step of impregnating the fibrous substrate, based on long glass fibers, with the liquid (meth)acrylic syrup described previously. This impregnation step takes place in a closed mold.

If the viscosity of the liquid (meth)acrylic syrup at a given temperature is slightly too high for the impregnation process, it is possible to heat the syrup so as to have a more liquid syrup for sufficient wetting and correct and complete impregnation of the fibrous substrate.

As regards the fibrous substrate, mention may be made of glass fabrics comprising glass fibers obtained from silica or from molten mixtures after passing through a die. The substrate may be in the form of strips, laps, braids, locks or parts. The fibrous material may have various forms and dimensions, either one-dimensional, two-dimensional or three-dimensional. A fibrous substrate comprises an assembly of one or more fibers. When the fibers are continuous, their assembly forms fabrics.

The one-dimensional form corresponds to linear long fibers. The fibers may be discontinuous or continuous. The fibers may be arranged randomly or parallel to each other, in the form of a continuous filament. A fiber is defined by its aspect ratio, which is the ratio between the length and the diameter of the fiber. The fibers used in the present invention are long glass fibers or continuous glass fibers. The fibers have an aspect ratio of at least 1000, preferably at least 1500, more preferably at least 2000, advantageously at least 3000 and more advantageously at least 5000, even more advantageously at least 6000, more advantageously still at least 7500 and most advantageously at least 10 000.

The two-dimensional form corresponds to nonwoven or woven fibrous mats or reinforcements or bundles of fibers, which may also be braided. Even if the two-dimensional form has a certain thickness and consequently in principle a third dimension, it is considered as two-dimensional according to the present invention.

The three-dimensional form corresponds, for example, to nonwoven fibrous mats or reinforcements or stacked or folded bundles of fibers or mixtures thereof, an assembly of the two-dimensional form in the third dimension.

The origins of the fibrous material may be natural or synthetic. As natural material one can mention plant fibers, wood fibers, animal fibers or mineral fibers.

Natural fibers are, for example, sisal, jute, hemp, flax, cotton, coconut fibers, and banana fibers, Animal fibers are, for example, wool or hair.

As synthetic material, mention may be made of polymeric fibers chosen from fibers of thermosetting polymers, of thermoplastic polymers or mixtures thereof.

The polymeric fibers may consist of polyamide (aliphatic or aromatic), polyester, polyvinyl alcohol, polyolefins, polyurethanes, polyvinyl chloride, polyethylene, unsaturated polyesters, epoxy resins and vinyl esters.

The mineral fibers may also be chosen from glass fibers, especially of E, R or S2 type, carbon fibers, boron fibers or silica fibers.

Preferably, the fibrous substrate chosen comprises glass fibers, especially of type E, R or S2, the refractive index Il1 of which ranges from 1.52 to 1.6. Advantageously, the chosen fibers are fibers S2 of refractive index 1.52.

The fibers of the fibrous substrate have a diameter between 0.005 µm and 100 µm, preferably between 1 µm and 50 µm, more preferably between 5 µm and 30 µm and advantageously between 10 µm and 25 µm.

Preferably, the fibers of the fibrous substrate of the present invention are chosen from continuous fibers (meaning that the aspect ratio does not necessarily apply as for long fibers) for the one-dimensional form, or for long or continuous fibers for the two-dimensional or three-dimensional form of the fibrous substrate.

According to an additional aspect, the invention relates to a polymeric composite material comprising a thermoplastic (meth)acrylic matrix and a fibrous substrate used as reinforcement, in which the fibrous substrate consists of long glass fibers, said composite material being characterized in that the thermoplastic (meth)acrylic matrix is Obtained after polymerization of said fibrous substrate preimpregnated with said liquid (meth)acrylic syrup.

Another aspect of the present invention is a process for manufacturing mechanical or structured parts or products, comprising the following steps:
a) impregnating a fibrous substrate, said fibrous substrate consisting of long glass fibers, with the liquid (meth)acrylic syrup,
b) polymerizing the liquid (meth)acrylic syrup impregnating said fibrous substrate.

The impregnation of the fibrous substrate in step a) is preferably performed in a closed mold.

Advantageously, step a) and step b) are performed in the same closed mold.

After polymerization of the substrate based on glass fibers preimpregnated with syrup, a part made of composite material is obtained, the thermoplastic matrix of which has a refractive index n4 that tends toward that n1 of the substrate made of glass fibers. Preferably, the refractive index n4 of the thermoplastic matrix is identical to that n1 of the substrate made of glass fibers.

As regards the measurement of the transparency, use is advantageously made of the light transmission method according to standard ASTM D 1003.

As regards the process for manufacturing composite parts, various processes could be used for preparing parts. Mention may be made of infusion, vacuum bag molding, pressure bag molding, autoclave molding, resin transfer molding (RTM), reaction injection molding (RIM), reinforced reaction injection molding (R-RIM) and variants thereof, press molding or compression molding.

Most advantageously, the process for manufacturing composite parts is chosen from resin transfer molding and infusion.

All the processes comprise the step of impregnating the fibrous substrate with the liquid (meth)acrylic syrup before the step of polymerization in a mold.

The step of polymerization of the liquid (meth)acrylic syrup impregnating said fibrous substrate takes place after the step of impregnation in the same mold.

Resin transfer molding is a process using a two-sided mold set which forms both surfaces of a composite material. The lower side is a rigid mold. The upper side can be a rigid or flexible mold. Flexible molds can be made from composite materials, silicone or extruded polymer films such as nylon. The two sides fit together to form a mold cavity. The distinguishing feature of resin transfer molding is that the fibrous substrate is placed into this cavity and the mold set is closed prior to the introduction of the liquid (meth)acrylic syrup, Resin transfer molding includes numerous varieties which differ in the mechanics of introduction of the liquid (meth)acrylic syrup into the fibrous substrate in the mold cavity. These variations range from vacuum infusion to vacuum assisted resin transfer molding (VARTM). This process may be performed at room or elevated temperature.

With the infusion process, the liquid (meth)acrylic syrup must have the appropriate viscosity for this process for preparing the polymeric composite material. The liquid (meth)acrylic syrup is sucked into the fibrous substrate, which is in a special mold, by applying a gentle vacuum. The fibrous substrate is infused and completely impregnated by the liquid (meth)acrylic syrup.

One advantage of this process is the large amount of fibrous material in the composite.

As regards the use of the composite parts thus manufactured, mention may be made of building, automotive applications, transport applications such as buses or lorries, nautical applications, railroad applications, sport, aeronautic and aerospace applications, photovoltaic applications, computer-related applications, construction and building applications, telecommunication applications and wind energy applications.

The composite part is especially a construction or building part (facades, panels, roofing), motor vehicle part, bus part, boat part, train part, sport article, plane or helicopter part, space ship or rocket part, photovoltaic module part, a material for construction or building, wind turbine part, furniture part, telephone or cellphone part, computer or television part, or printer or photocopier part.

The parts made of composite material obtained after impregnation of a fibrous substrate with the (meth)acrylic syrup and polymerization are transparent (or translucent). The (meth)acrylic thermoplastic matrix shows very good resistance to UV radiation, and as such these parts can be used on the exterior with no problem. As regards the recycling of the thermoplastic composite part, it may be performed by grinding or depolymerization of the thermoplastic polymer.

Grinding is performed mechanically in order to obtain smaller pieces of the part. As the part comprises a thermoplastic polymer, this polymer can be heated, and the pieces once again transformed within a certain limit in order to obtain a recycled object.

Preferably, the thermoplastic composite part is heated to perform pyrolysis or thermal decomposition of the PMMA and to recover methyl methacrylate as monomer.

Advantageously, at least 50% by weight of the MMA present in the polymer is recovered by thermal decomposition.

The part is brought to a temperature of at least 200° C. and less than or equal to 400° C.

Example: Manufacture of a Transparent Thermoplastic Composite Material

The syrup is prepared by dissolving 25% by weight of PMMA (Xiran® SMA28110 from the company Polyscope Polymers B.V., an MMA copolymer comprising methyl methacrylate) in 75% by weight of methyl acrylate, which is stabilized with HOME (hydroquinone monomethyl ether). To the 100% by weight of syrup is added 2% by weight of benzoyl peroxide (BPO—Luperox® A75 from Arkema) and 0.2% by weight of DMT (N,N-dimethyl-p-toluidine from Sigma-Aldrich). The syrup has a dynamic viscosity of 520 mPa·s at 25° C. The syrup is injected into a closed mold comprising a glass fabric as fibrous substrate and polymerized at 25° C. for 80 minutes.

First Step: Preparation of the (Meth)Acrylic Syrup

A syrup is prepared by dissolving 25% by weight of SMA (styrene-maleic anhydride) containing 28% of maleic anhydride in 75% by weight of methyl methacrylate, which is stabilized with HQME (hydroquinone monomethyl ether). This polymer dissolves in the methyl methacrylate monomer and it has a refractive index of 1.59.

These proportions of SMA in the methacrylate monomer make it possible to obtain a syrup with a refractive index n4 close to 1.52 and a dynamic viscosity at 25° C. of 500 mPa·s.

Second Step: Impregnation of a Fibrous Substrate and Polymerization

A fibrous substrate made of glass fibers, with a refractive index 1 equal to 1.52, is placed in a closed mold. The (meth)acrylic syrup is injected into the closed mold comprising the glass fabric and polymerized at 25° C. for 80 minutes.

The thermoplastic composite part obtained has contact transparency, allowing more than 50% of the light to pass through, and has no defects. Furthermore, this part is highly resistant to UV rays and may thus be used intensively on the exterior. It is therefore perfectly suitable for equipping roofs or building facades.

The invention claimed is:

1. A liquid (meth)acrylic syrup for impregnating a fibrous substrate, said fibrous substrate consisting of long glass fibers of refractive index n1, wherein said impregnation syrup comprises:
   a) a (meth)acrylic monomer,
   b) at least one component, of refractive index n3, such that n3≥n1, wherein said component b) is selected from the group consisting of
      styrene-maleic anhydride copolymer, present in a proportion of at least 10% by weight of the total liquid (meth)acrylic syrup, said styrene-maleic anhydride copolymer comprising between 25% and 50% of maleic anhydride monomer units, and
      styrene monomer, present in a proportion of at least 10% by weight of the total liquid (meth)acrylic syrup;
   and
   optionally c) a (meth)acrylic polymer of refractive index n2, wherein n3>n2, and wherein said (meth)acrylic polymer c) may or may not be present if component b) is a styrene-maleic anhydride copolymer, but said (meth)acrylic polymer c) must be present when component b) is styrene monomer,
   said (meth)acrylic syrup having a refractive index n4 which is about the refractive index of n1 and a dynamic viscosity of between 10 mPa·s and 10,000 mPa·s.

2. The liquid (meth)acrylic syrup as claimed in claim 1, wherein said at least one component b) is chosen from:
   styrene-maleic anhydride copolymer, present in a proportion of at least 15% by weight of the total liquid (meth)acrylic syrup;
   and
   styrene monomer, present in a proportion of at least 15% by weight of the total liquid (meth)acrylic syrup.

3. The liquid (meth)acrylic syrup as claimed in claim 1, wherein said syrup comprises:
   a) from 70% by weight to 80% by weight of the (meth)acrylic monomer, and
   b) from 20% by weight to 30% by weight of the styrene-maleic anhydride copolymer.

4. The liquid (meth)acrylic syrup as claimed in claim 1, wherein said syrup comprises:
   a) from 50% by weight to 80% by weight of the (meth)acrylic monomer,
   b) from 10% by weight to 25% by weight of the styrene monomer, and
   c) from 10% by weight to 25% by weight of the (meth)acrylic polymer.

5. The liquid (meth)acrylic syrup as claimed in claim 1, wherein said syrup comprises:
   a) from 50% by weight to 80% by weight of the (meth)acrylic monomer,
   b) from 10% by weight to 45% by weight of the styrene monomer,
   c) from 2.5% by weight to 30% by weight of the (meth)acrylic polymer, and
   d) from 2.5% by weight to 30% by weight of a (meth)acrylic-styrene copolymer, comprising from 10% to 50% by weight of styrene.

6. The liquid (meth)acrylic syrup as claimed in claim 5, wherein said syrup comprises:
   a) from 50% by weight to 80% by weight of the (meth)acrylic monomer,
   b) from 10% by weight to 40% by weight of the styrene monomer,
   c) from 5% by weight to 30% by weight of the (meth)acrylic polymer, and
   d) from 5% by weight to 30% by weight of the (meth)acrylic-styrene copolymer, comprising from 10% to 50% by weight of styrene.

7. The liquid (meth)acrylic syrup as claimed in claim 1, wherein the (meth)acrylic polymer is a homo- or copolymer of methyl methacrylate (MMA) or a mixture thereof.

8. The liquid (meth)acrylic syrup as claimed in claim 7, wherein the copolymer of methyl methacrylate (MMA) comprises at least 70%, by weight of methyl methacrylate (MMA).

9. The liquid (meth)acrylic syrup as claimed in claim 7, wherein the copolymer of methyl methacrylate (MMA) comprises from 70% to 99.7% by weight of methyl methacrylate and from 0.3 to 30% by weight of at least one monomer bearing at least one ethylenic unsaturation that can copolymerize with the methyl methacrylate.

10. The liquid (meth)acrylic syrup as claimed in claim 1, wherein the (meth)acrylic polymer comprises a comonomer, said comonomer being an alkyl acrylate containing an alkyl group of 1 to 12 carbon atoms.

11. The liquid (meth)acrylic syrup as claimed in claim 10, wherein said comonomer is chosen from methyl acrylate and ethyl acrylate, and a mixture thereof.

12. The liquid (meth)acrylic syrup as claimed in claim 1, wherein the (meth)acrylic monomer is selected from the group consisting of acrylic acid, methacrylic acid, alkyl acrylic monomers and alkyl methacrylic monomers, and mixtures thereof, wherein said alkyl group of the alkyl acrylic or alkyl methacrylic monomers contains from 1 to 22 linear, branched or cyclic carbons.

13. The liquid (meth)acrylic syrup as claimed in claim 12, wherein 50% by weight of the (meth)acrylic monomer is methyl methacrylate.

14. The liquid (meth)acrylic syrup as claimed in claim 1, wherein the (meth)acrylic monomer is selected from the group consisting of methyl methacrylate, ethyl methacrylate, methyl acrylate, ethyl acrylate, methacrylic acid, acrylic acid, n-butyl acrylate, isobutyl acrylate, n-butyl methacrylate, isobutyl methacrylate, cyclohexyl acrylate, cyclohexyl methacrylate, isobornyl acrylate and isobornyl methacrylate, and mixtures thereof.

15. The liquid (meth)acrylic syrup as claimed in claim 1, wherein the (meth)acrylic monomer is chosen from methyl methacrylate, isobornyl acrylate and acrylic acid, and mixtures thereof.

* * * * *